April 26, 1949.  A. J. SAULINO  2,468,239
METHOD OF BONDING RUBBER TO METAL
Filed Nov. 18, 1943
Fig. 1
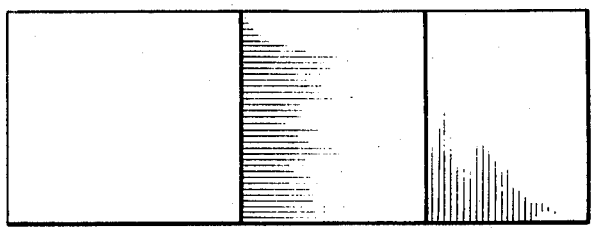
Fig. 2
INVENTOR.
ANTHONY J. SAULINO
BY
Charles C. Willson
ATTORNEY Patented Apr. 26, 1949

2,468,239

UNITED STATES PATENT OFFICE 2,468,239

METHOD OF BONDING RUBBER TO METAL

Anthony J. Saulino, Detroit, Mich., assignor to United States Rubber Company, New York, N. Y., a corporation of New Jersey Application November 18, 1943, Serial No. 510,784

4 Claims. (Cl. 18—59)

The invention relates to a method of bonding rubber to metal and in particular it relates to a method of bonding rubber securely to brass plated ferrous metals. More particularly the invention relates to steam treatment of brass plated metal parts prior to bonding with rubber composition to secure a strong bond between the rubber and metal.

One method commonly employed heretofore for bonding rubber to ferrous metals is carried out by brass plating the ferrous metal and bringing the plated metal into contact with unvulcanized rubber having a coat of cement on its outer surface. Upon vulcanization a good bond is usually obtained between the rubber and the metal. This conventional method, requires that the unvulcanized rubber and/or metal parts be coated with a layer of cement in order to obtain adequate adhesion. However, in injection molding it is not possible to coat the rubber surface with a cement. Also because of the wiping action of the injected rubber it is not practical to coat the brass plated parts with cement. It is, therefore, desirable that a bond be obtained directly between the rubber and the brass plated parts without a layer of cement being interposed therebetween. As a general rule some degree of adhesion can be obtained directly between the rubber and the brass plated surface; however, the strength of the adhesion is not satisfactory for commercial uses such, for example, as that of forming a yielding connection between spaced metal parts. Furthermore, there is considerable inconsistency in the resulting bond.

In attempting to obtain proper adhesion between rubber and brass plated metals, various treatments have been employed including heating of the metal parts prior to contact with the rubber. The heat treatment of the metal parts results in some improvement in the bond but such degree of adhesion is not uniform.

I have found that substantial improvements in the degree of adhesion between rubber and brass plated metals can be obtained by subjecting the metal parts to the direct contact of steam at elevated temperature prior to contact with a rubber composition to thereby condition the surface of the metal so that the rubber will bond securely thereto.

Among the objects of my invention are to obtain a high degree of adhesion between rubber and brass plated metals; to obtain a high degree of uniformity of adhesion between rubber and metal parts; to eliminate the need for the application of cements applied to the rubber and/or metal parts; and to provide a method of improving the bond between rubber and metal which may be practiced efficiently and economically.

In the accompanying drawing:

Fig. 1 is a plan view cut away to expose the successive layers of rubber, brass plate, and ferrous metal; and Fig. 2 is a longitudinal sectional view of Fig. 1.

In bonding rubber to metal in accordance with the method of my invention it is first necessary to provide a brass plating on the surface of the metal. This is accomplished according to conventional practices. The plated metal part is then subjected to the direct contact of steam by placing the part in a container or enclosure and allowing the steam to come in intimate contact therewith. Preferably the steam pressure should be between 60 and 150 pounds per square inch and the metal part should be subjected to the steam treatment for a period of from one to ten minutes. Better results are obtained by allowing the parts to engage with flowing steam as by providing a partially opened exhaust communicating with the container. After the brass plated metal parts are so treated they are removed from the steam treating enclosure and are then brought into contact with the unvulcanized rubber composition. This might be accomplished in accordance with the conventional practice of molding rubber goods or the rubber may be brought into contact with the metal parts by injecting the rubber under pressure into a closed mold.

The method of the present invention may be employed in various fields where a strong bond is desired between rubber and brass plated metals, such, for example, as where the rubber is employed to form a yielding connection between co-operating metal parts, as in the Robertson Patent 2,008,772 where a yielding oscillating joint is provided by employing an elastic ring or rubber sleeve as an intervening cushion between a metal outer sleeve and metal inner sleeve. In order to provide an inner sleeve with a rubber cushion in accordance with the present invention, the inner sleeve, which must be brass plated, is placed in a steam testing receptacle where it should be subjected for a few minutes to the direct contact of moving steam at a temperature considerably above 212° F. The sleeve should then be removed and placed in an injection mold to form the desired rubber cushion about the sleeve and firmly vulcanize this cushion to the steam treated surfaces of the sleeve.

There are definite advantages in treating the brass plated parts with steam. In the first place the temperature alone is an important factor. When hot rubber is injected and brought into contact with a hot plated surface there results a desirable "wetting" action which in itself brings about a better union between the rubber and the metal. The heating of the metal prevents condensation of moisture on the metal parts. Also, as a result of the preheating of the metals, a reduction in curing time is effected. It has been found, however, that heating of the metal parts alone will not result in the desired high degree of adhesion. For example, if metal parts are heated in an air oven some degree of benefit is obtained when compared with adhesion to cold metals. However, the degree of adhesion when the metals are heated in an air oven falls far below the results obtained when the metal parts are treated by exposing them to the direct contact of steam. Many experiments have been conducted in order to determine the degree of adhesion obtained by various methods. The following table indicates by way of comparison the degree of adhesion obtained by utilizing various methods of preheating:

| Brass Plated Metal Parts | Adhesion—Lbs. Per Linear Inch [1] |
|---|---|
| Cold (Room Temperature) | 34 |
| Warm (From Vulcanizing Press) | 52 |
| Heated in Air Oven at 350° F | 80 |
| Open Steam—10 min. at 60 lbs. pressure | 200 |
| Open Steam—1 to 3 min. at 150 lbs. pressure | 223 |

[1] Adhesion in pounds per linear inch is a strip test, determined by bonding a thin flexible metal strip one inch wide to a stiff brass plated metal bar one inch wide, and then pulling the strip at right angles to the face of the bar to tear it therefrom, and measure the pounds full.

From the above table it is apparent that heat alone will not result in the attainment of the desired adhesion but that the brass plated surface must be subjected to the direct contact of steam to obtain the desired results. While it is not certain why substantial improvements are obtained after subjecting the brass plated surface to steam having a temperature considerably above 212° F., it is apparent that the pressure of the steam will force it into intimate contact with the surface of the metal, and it is believed that the heat, pressure, and moisture from the steam together clean the surface of the metal thoroughly so that the rubber will adhere firmly and uniformly thereto. There is a possibility, however, that some form of oxidation may take place as a result of the steam treatment which improves the rubber bond. The hot temperature of the metal upon leaving the steam treating chamber insures that any moisture which may cling thereto from the steam will be immediately driven off, and while the rubber is preferably applied while the metal is hot from the steam treatments, it may be applied after the metal has cooled provided the surface is still clean from the steam treatment.

Prior to brass plating, metal parts are usually subjected to a pickling operation. In this operation the metal surface becomes etched and in some cases relatively deep microscopic pockets occur. These pockets frequently retain traces of the pickling bath, notwithstanding repeated water or chemical rinses. Also traces of electrolytes sometimes become trapped in the pockets during the brass plating operation. The presence of electrolytes, acids, strong bases or salts are harmful agents which affect adhesion between rubber and the brass plate. The brass plate itself is relatively porous and any harmful agents which may be trapped beneath the brass plate may upon application of vulcanizing temperatures diffuse to the surface of the brass plate and destroy the adhesion with the rubber composition. It is, therefore, believed that the steam treatment in which the metal parts are subjected to the direct contact of steam at temperatures of preferably from 290° F. to 67° F. causes the harmful agents to migrate to the brass plated surface where the agents are carried away by contact with the steam. The plated part now being free from migratory harmful agents and having its temperature elevated presents an ideal surface against which rubber compositions may be bonded. One of the important results of this process is the high degree of uniformity of the bond obtained.

As thus described, it is believed apparent that I have provided a novel method of improving the bond between rubber and metal parts, and in obtaining substantial reductions in defective bonds which heretofore have been a major problem in the industry.

While I have described a preferred method of practicing my invention, it is to be understood that it is susceptible of modifications as appearing within the spirit of the invention and the scope of the appended claims.

Having thus described my invention, what I claim and desire to protect by Letters Patent is:

1. The method of securing rubber to a ferrous metal which comprises plating the metal with a layer of brass, exposing the surface of the brass to the direct contact of steam for at least one minute at a pressure of at least 60 pounds so as to force the steam into penetrating contact with the surface of said layer, then applying rubber to this steam contacted surface and vulcanizing it directly to this surface.

2. The method of securing rubber to a ferrous metal which comprises plating the metal with a layer of brass, exposing the surface of the brass to the direct contact of steam for at least one minute at a pressure of 60 to 150 pounds so as to force the steam into penetrating contact with the surface of said layer, then applying rubber to this steam contacted surface and vulcanizing it directly to this surface.

3. The method of securing rubber to a ferrous metal which comprises plating the metal with a layer of brass, exposing the surface of the brass to the direct contact of steam so as to raise the temperature of the metal to at least 290° F. and force the steam into penetrating engagement with the surface of said layer, then applying rubber to this steam contacted surface and vulcanizing it directly to this surface.

4. The method of securing rubber to a ferrous metal which comprises plating the metal with a layer of brass, exposing the surface of the brass to the direct contact of steam at an elevated temperature and pressure so as to force the steam into penetrating contact with the brass surface long enough to heat this surface considerably above 212° F., and then while this surface is still hot applying rubber thereto and vulcanizing it directly to this brass surface.

ANTHONY J. SAULINO.

REFERENCES CITED

The following references are of record in the file of this patent:

UNITED STATES PATENTS

| Number | Name | Date |
|---|---|---|
| 133,259 | Rowley | Nov. 19, 1872 |
| 260,020 | Graecen | June 27, 1882 |
| 753,610 | McDowell | Mar. 1, 1904 |
| 2,017,071 | Minor | Oct. 15, 1935 |
| 2,130,905 | Schelhammer | Sept. 20, 1938 |
| 2,320,998 | Beebe | June 8, 1943 |